(12) United States Patent
Phadke

(10) Patent No.: US 6,504,739 B2
(45) Date of Patent: Jan. 7, 2003

(54) SIMPLE CONTROL CIRCUIT FOR SYNCHRONOUS RECTIFIERS USED IN ZVS PHASE SHIFTED FULL BRIDGE CONVERTER

(75) Inventor: Vijay Gangadhar Phadke, Mandaluyong (PH)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 09/861,367

(22) Filed: May 18, 2001

(65) Prior Publication Data

US 2002/0172061 A1 Nov. 21, 2002

(51) Int. Cl.⁷ .......................... H02M 7/217; H02M 5/42
(52) U.S. Cl. ............................ 363/127; 363/17; 363/89
(58) Field of Search ..................... 363/127, 98, 97, 363/95, 131, 132, 16, 17, 89

(56) References Cited

U.S. PATENT DOCUMENTS

| | | | |
|---|---|---|---|
| 4,864,479 A | 9/1989 | Steigerwald et al. | |
| 4,884,186 A | 11/1989 | Small | |
| 4,912,622 A | 3/1990 | Steigerwald et al. | |
| 4,953,068 A | 8/1990 | Henze | |
| 4,967,332 A | 10/1990 | Claydon et al. | |
| 5,027,264 A | 6/1991 | DeDoncker et al. | |
| RE33,866 E * | 3/1992 | Schutten et al. | 363/17 |
| 5,099,202 A | 3/1992 | Claydon et al. | |
| 5,132,888 A | 7/1992 | Lo et al. | |
| 5,132,889 A | 7/1992 | Hitchcock et al. | |
| 5,140,509 A * | 8/1992 | Murugan | 363/17 |
| 5,157,592 A | 10/1992 | Walters | |
| 5,157,593 A | 10/1992 | Jain | |
| 5,189,969 A | 3/1993 | Redl et al. | |
| 5,208,738 A | 5/1993 | Jain | |
| 5,227,961 A | 7/1993 | Claydon et al. | |
| 5,231,563 A * | 7/1993 | Jitaru | 363/98 |
| 5,245,520 A * | 9/1993 | Imbertson | 363/17 |
| 5,255,174 A * | 10/1993 | Murugan | 363/17 |
| 5,291,384 A | 3/1994 | Mammano et al. | |
| 5,315,498 A | 5/1994 | Berrios et al. | |
| 5,438,497 A | 8/1995 | Jain | |
| 5,442,540 A | 8/1995 | Hua et al. | |
| 5,481,449 A | 1/1996 | Kheraluwala et al. | |
| 5,539,630 A | 7/1996 | Pietkiewicz et al. | |
| 5,546,294 A | 8/1996 | Schutten et al. | |
| 5,563,775 A | 10/1996 | Kammiller | |
| 5,610,508 A | 3/1997 | Kammiller | |
| 5,619,401 A | 4/1997 | Karlsson et al. | |

(List continued on next page.)

OTHER PUBLICATIONS

Laszlo Balogh, "Design Review: 100W, 400kHz, DC/DC Converter with Current Doubler Synchronous Rectificatin Achieves 92% Efficiency", SEM–1100 edition of the Unitrode Switching Regulated Power Supply Design Seminar Manual, by Unitrode corporation, 1996.

Primary Examiner—Rajnikant B. Patel
(74) Attorney, Agent, or Firm—Harness, Dickey & Pierce, P.L.C.

(57) ABSTRACT

An improved secondary control circuit is provided for controlling synchronous rectifiers in a switching power converter. The secondary control circuit employs control signals from a primary control circuit to drive two synchronous rectifiers. In particular, the secondary control circuit is operable to drive both synchronous rectifiers to an on state during a dead time period of operation. The onset of the dead time period occurs when the diagonal conducting switching device is driven to an off state. The secondary control circuit is further operable to drive the second of the two synchronous rectifiers to an on state only after one of the diagonal switching devices has been driven to an off state by the primary control circuit. In this way, the improved secondary control circuit eliminates the risk of cross conduction between the synchronous rectifiers.

26 Claims, 5 Drawing Sheets

U.S. PATENT DOCUMENTS

| | | |
|---|---|---|
| 5,675,476 A | 10/1997 | Nostwick |
| 5,684,683 A | 11/1997 | Divan et al. |
| 5,781,419 A | 7/1998 | Kitkut et al. |
| 5,864,471 A | 1/1999 | Kammiller et al. |
| 5,875,103 A | 2/1999 | Bhagwat et al. |
| 5,877,947 A | 3/1999 | Chen et al. |
| 5,898,581 A | 4/1999 | Liu |
| 5,910,886 A | 6/1999 | Coleman |
| 5,923,547 A | 7/1999 | Mao |
| 5,946,200 A | 8/1999 | Kim et al. |
| 5,986,912 A * | 11/1999 | Hsiao et al. ................ 363/147 |
| 6,016,258 A | 1/2000 | Jain et al. |
| 6,038,148 A | 3/2000 | Farrington et al. |
| 6,219,264 B1 * | 4/2001 | Drobnik .................... 363/127 |
| 6,275,401 B1 * | 8/2001 | Xia ............................ 363/127 |

* cited by examiner

US 6,504,739 B2

SIMPLE CONTROL CIRCUIT FOR SYNCHRONOUS RECTIFIERS USED IN ZVS PHASE SHIFTED FULL BRIDGE CONVERTER

FIELD OF THE INVENTION

The present invention relates generally to switching power supplies and, more particularly, to a simplified control circuit for synchronous rectifiers used in ZVS phase shifted full bridge converters.

BACKGROUND OF THE INVENTION

Recent advancements in MOSFET switch technology makes synchronous rectifiers a feasible and competitive rectification technique for low voltage, high current DC/DC converters. Synchronous MOSFET switches are used to increase efficiency, reduce power losses, reduce electromagnetic interference and facilitate zero voltage switching (ZVS) in such converters. However, proper timing of the synchronous rectifiers is critical to the efficient operation of the converter.

In one known technique, the synchronous rectifiers may be driven by the control circuit used to drive the primary side of the transformer in the converter. This technique is commonly referred to as control driven synchronous rectification. One proposed implementation of this technique is presented by Laszlo Balogh in "Design Review: 100W, 400 kHz, DC/DC Converter with Current Doubler Synchronous Rectification Achieves 92% Efficiency", SEM-1100 edition of the Unitrode Switching Regulated Power Supply Design Seminar Manual, by Unitrode corporation, 1996.

In this proposed prior art technique, the DC/DC converter is implemented using a phase shifted full bridge configuration on the primary side and a current doubler output with synchronous rectification on the secondary side. Of particular interest, a secondary control circuit 10 as shown in FIG. 1 is used to drive the synchronous rectifiers (not shown). The secondary control circuit 10 receives as input the primary drive signals 12 for each of the switching devices on the primary side of the converter. The drive signals 12 are in turn transmitted via a signal transformer 14 to the secondary side of the converter. The secondary control circuit 10 then outputs a secondary drive signal 16 for each of the synchronous rectifiers.

Referring to FIG. 2, a timing diagram further illustrates the operation of the prior art secondary control circuit 10. In this proposed technique, both of the synchronous rectifiers are turned on during a dead time period of operation as shown at 22, where a dead period is defined as the time at which no current is flowing from the input voltage source through the primary winding of the transformer of the converter. When diagonal switching devices on the primary side of the transformer are conducting, one of the two synchronous rectifiers is generally in an on state. The onset of a dead time period occurs when one of the two diagonal conducting switching devices is driven to an off state. It should be noted that the second of the two synchronous rectifiers is driven to an on state at the same time as the diagonal switching device is driven to an off state. However, due to parasitic delays and other variations inherent in the switching devices, it is conceivable that the second synchronous rectifier may be driven to an on state before the diagonal conducting switching device is driven to an off state. In this scenario, an opportunity for cross conduction between the synchronous rectifiers is introduced into the converter.

Therefore, it is desirable to provide an improved control circuit for controlling the synchronous rectifiers employed in switching power converters. It is envisioned that the improved control circuit is operable to drive both synchronous rectifiers to an on state during a freewheeling period, and yet eliminate the risk of cross conduction between the synchronous rectifiers.

SUMMARY OF THE INVENTION

In accordance with the present invention, an improved secondary control circuit is provided for controlling synchronous rectifiers in a switching power converter. The secondary control circuit employs control signals available for driving primary full bridge switches to drive two synchronous rectifiers. In particular, the secondary control circuit is operable to drive both synchronous rectifiers to an on state during a dead time period of operation. The dead time period is defined as the time at which no current is flowing from the input voltage source through a primary winding of a primary transformer of the converter. The onset of the dead time period occurs when the diagonal conducting switching devices is driven to an off state. In other words, the secondary control circuit is further operable to drive the second of the two synchronous rectifiers to an on state only after one of the diagonal switching devices is driven to an off state by the primary control circuit. In this way, the improved secondary control circuit eliminates the risk of cross conduction between the synchronous rectifiers.

For a more complete understanding of the invention, its objects and advantages, reference may be had to the following specification and to the accompanying drawings.

DETAILED DESCRIPTION OF THE PREFERRED EMBODIMENTS

Figure 3:
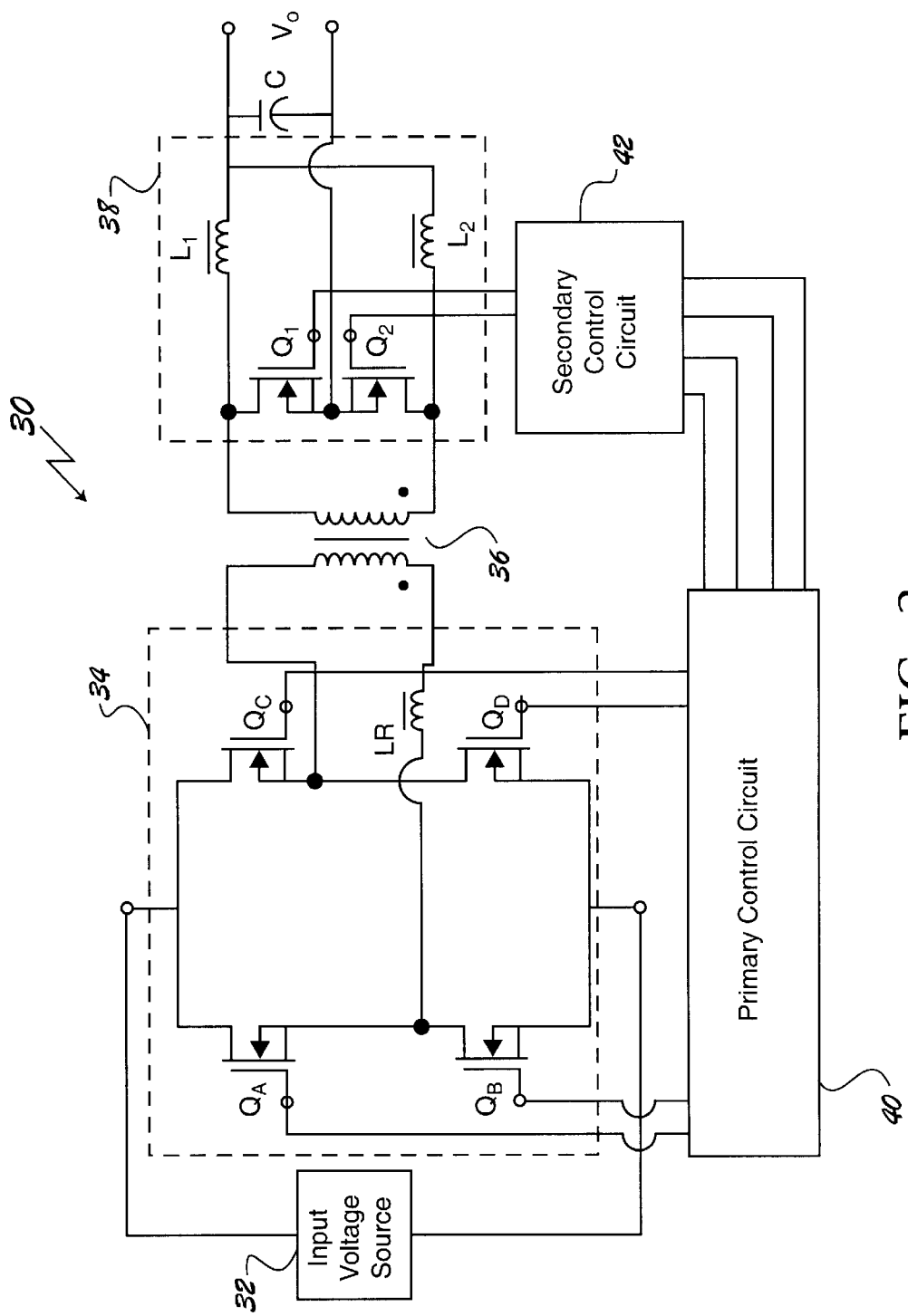
FIG. 3 is a schematic of a full bridge converter having current doubler synchronous rectifiers in accordance with the present invention.

A well known full bridge converter 30 having current doubler synchronous rectifiers is depicted in FIG. 3. The converter 30 generally includes an input voltage source 32, a primary switching circuit 34, a transformer 36, a rectifying circuit 38, a primary control circuit 40 and a secondary control circuit 42. While the following description is provided with reference to a full bridge converter, it is readily understood that the broader aspects of the present invention are applicable to other types of converter topologies, such as push pull or half bridge topologies, which may employ synchronous rectification.

The switching circuit 34 includes a first switching device $Q_A$ and a second switching device $Q_B$ connected in series to form a first switching leg, and a third switching device $Q_C$ and a fourth switching device $Q_D$ connected in series to form a second switching leg. Each of the switching legs is connected in parallel to the input voltage source 32. In a preferred embodiment, the primary switching device are further defined as MOSFET switches.

The switching circuit 34 is in turn connected to a primary winding of the transformer 36. In particular, a first junction point between the first switching device $Q_A$ and the second switching device $Q_B$ is connected to one end of the primary winding, and a second junction point between the third switching device $Q_C$ and the fourth switching device $Q_D$ is connected to the other end of the primary winding. An inductor Lr is commonly inserted in series with the primary winding of the transformer as shown. The input voltage source 32, the switching circuit 34, and the primary winding of the transformer are collectively referred to as the primary side of the converter.

A primary control circuit 40 operable to generate drive signals for each of the switching devices is connected to the switching circuit 34. In a preferred embodiment, the primary control circuit 34 is operable to supply substantially complementary drive signals to the switching devices in one of the switching legs and relatively phase shifted substantially complementary control signals to the switching devices in the other switching legs, so that diagonal switching devices conduct alternately with a dead time period therebetween. As is well known, the dead time period is defined as the time at which no current is flowing from the input voltage source through a primary winding of a transformer. In other words, the primary control circuit 34 provides zero voltage switching (ZVS) phase shifted control over the switching circuit 34. Although soft switching control is presently preferred, this is not intended as a limitation on the broader aspects of the present invention. On the contrary, hard switching control may be suitably employed by the primary control circuit 34. In this case, external delays may need to be introduced to ensure proper timing of the drive signals as is well known in the art.

The rectifying circuit 38 provides an output voltage $V_O$ for the converter. The rectifying circuit 38 generally includes two synchronous rectifiers which are connected to a secondary winding of the transformer 36. Although the present invention is not limited thereto, MOSFET switches are preferably used to implement the synchronous rectifiers.

Figure 6:
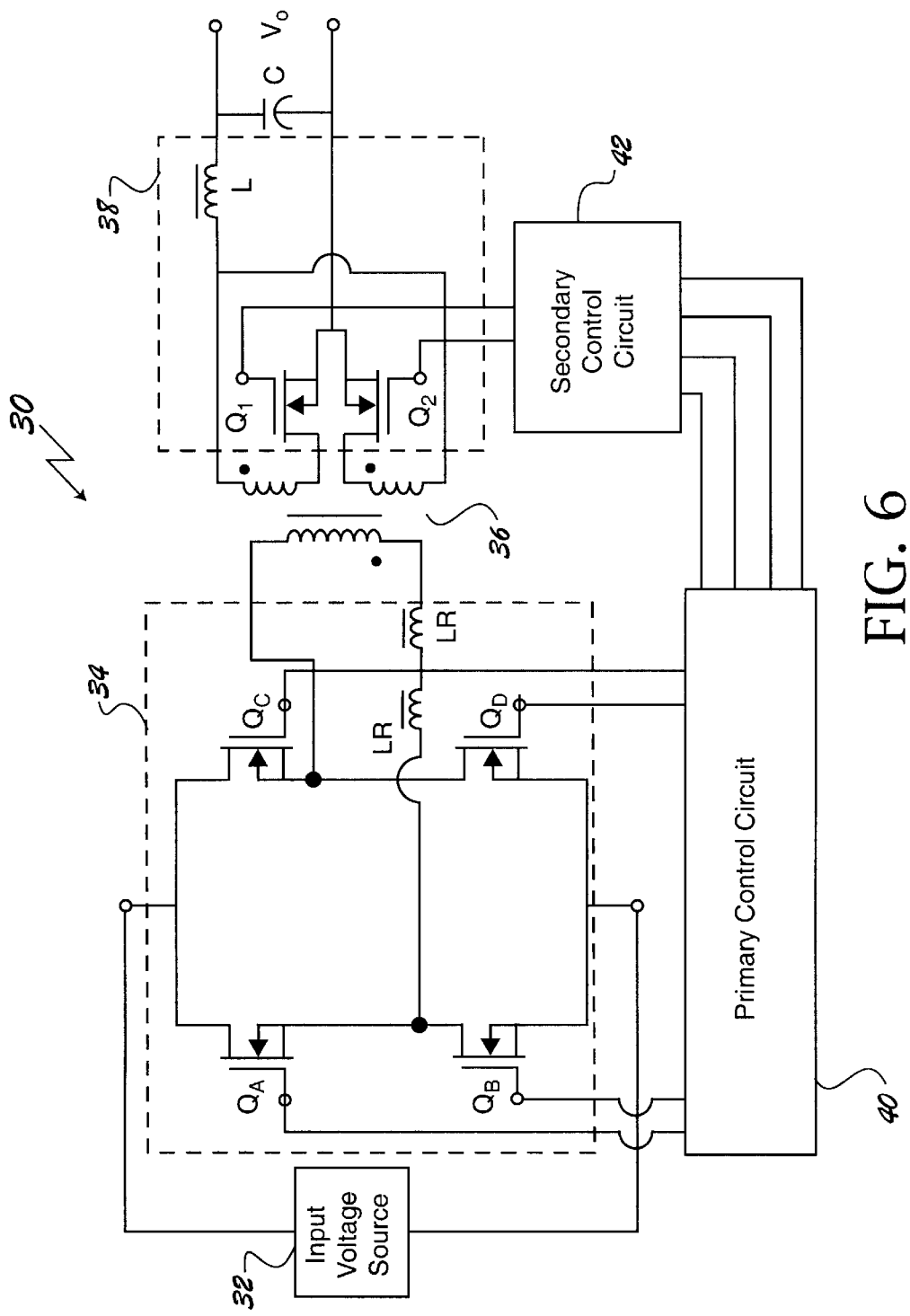
FIG. 6 is a schematic of a full bridge converter having an alternative synchronous rectifier configuration in accordance with the present invention.

More specifically, the rectifying circuit 30 includes a first rectifying switch $Q_1$ connected in series with a second rectifying switch $Q_2$. In this configuration, the drain for the first rectifying switch $Q_1$ is connected to one end of the secondary winding of the transformer, the drain for the second rectifying switch $Q_2$ is connected to the other end of the secondary winding of the transformer, and a junction point between the first rectifying switch $Q_1$ and the second rectifying switch $Q_2$ is connected to ground. The rectifying circuit 30 further includes a first inductor $L_1$ connected between the drain of the first rectifying switch $Q_1$ and an output terminal for the output voltage $V_O$ of the converter, and a second inductor $L_2$ connected between the drain of the second rectifying switch $Q_2$ and the output terminal for the output voltage $V_O$. The output voltage $V_0$ is measured across a capacitor C connected between the output terminal and ground. In other words, the rectifying circuit 38 is preferably implemented in a current doubler synchronous rectifier configuration. While the following description is provided with reference to a current doubler synchronous rectifier configuration, it is readily understood that the broader aspects of the present invention are applicable to other types of synchronous rectification circuits. For example, a full bridge converter having an alternative synchronous rectifying circuit is shown in FIG. 6.

Figure 5:
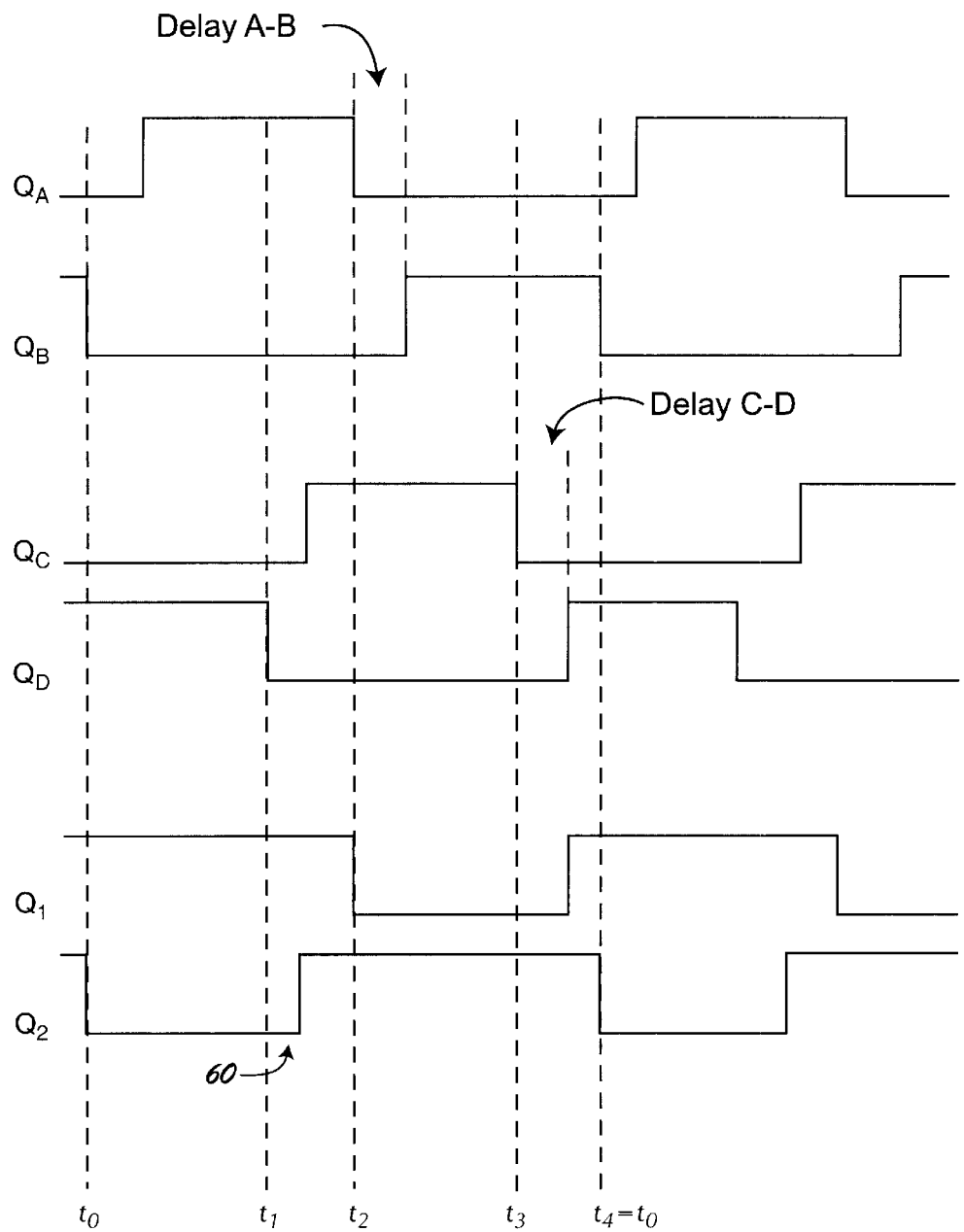
FIG. 5 is a timing diagram for the improved secondary control circuit in accordance with the present invention.

In accordance with the present invention, an improved secondary control circuit 42 is connected to the rectifying circuit 38. The secondary control circuit 42 employs control signals from primary control circuit 40 to drive the two synchronous rectifiers. The secondary control circuit is operable to drive both synchronous rectifiers to an on state during a dead time period of operation. When diagonal switching devices on the primary side of the transformer are conducting, one of the two synchronous rectifiers is generally in an on state. The onset of the dead time period occurs when one of the diagonal conducting switching devices is driven to an off state. The secondary control circuit 42 is operable to drive the second of the two synchronous rectifiers to an on state only after one of the diagonal switching devices is driven to an off state by the primary control circuit 34. In particular, the secondary control circuit 42 drives the second of the two synchronous rectifiers to an on state after either delay period, Delay A-B or Delay C-D, as shown in FIG. 5. In this way, the improved secondary control circuit 42 eliminates the risk of cross conduction between the synchronous rectifiers.

Figure 1:
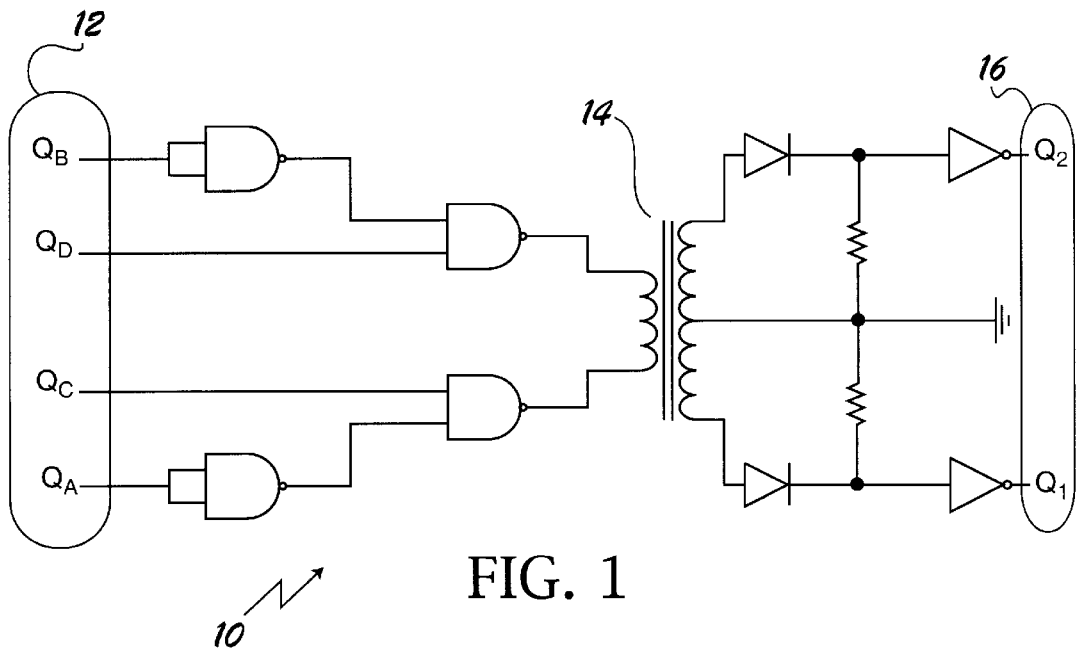
FIG. 1 is a logical circuit diagram for a conventional secondary control circuit for controlling synchronous rectifiers in a phase shifted full bridge converter circuit.
Figure 4:
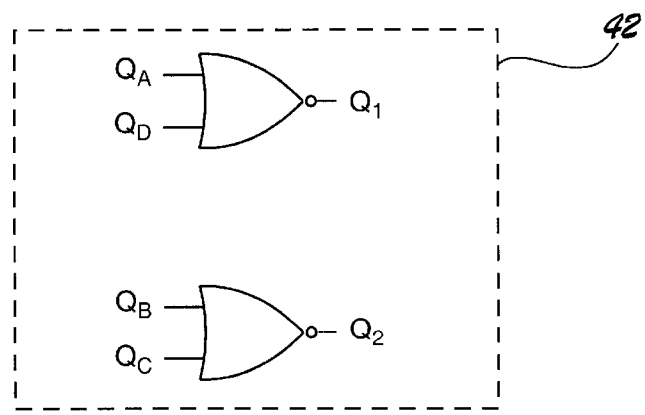
FIG. 4 is a logical circuit diagram for an improved secondary control circuit for controlling synchronous rectifiers in accordance with the present invention.
Figure 2:
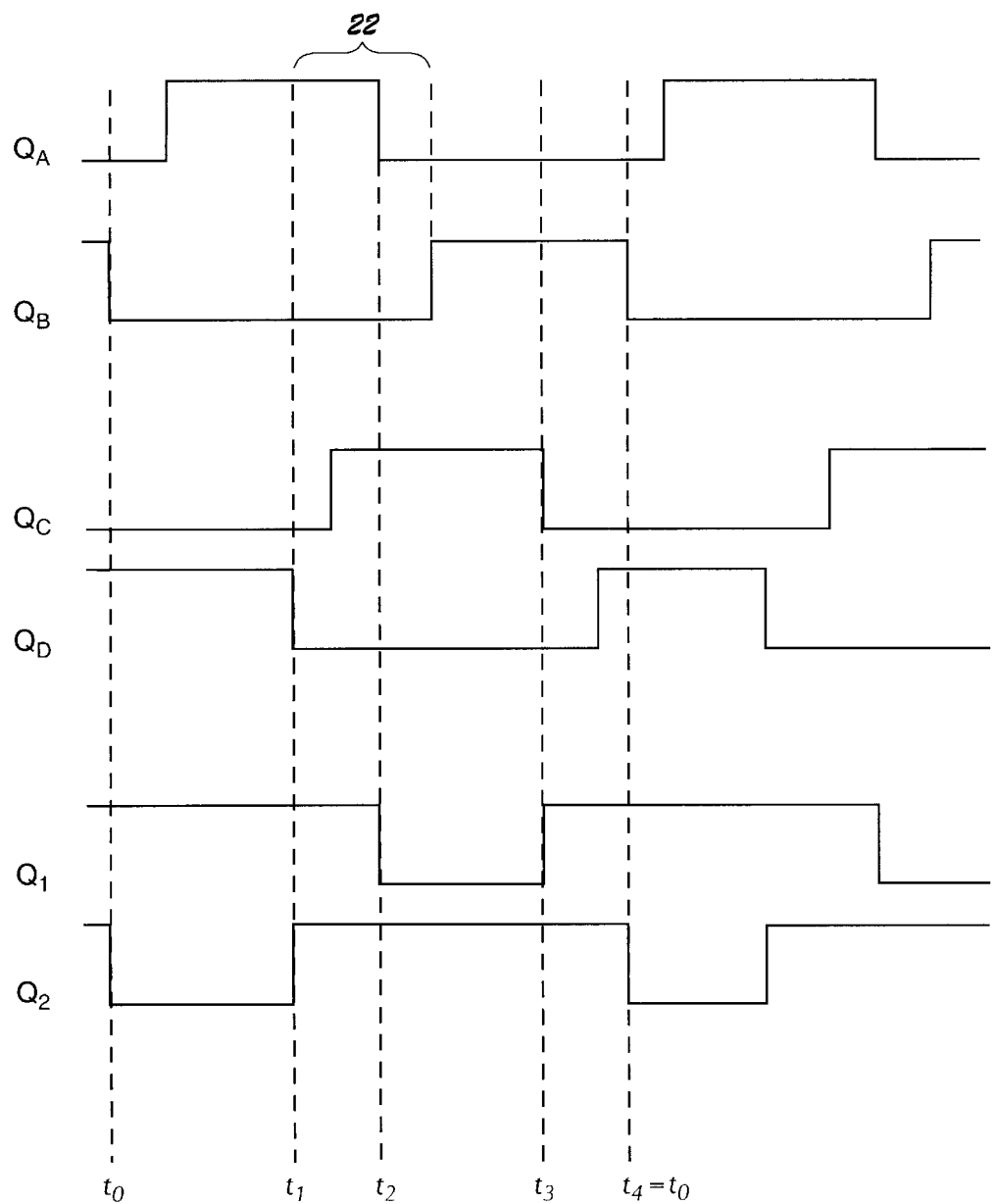
FIG. 2 is a timing diagram for the conventional secondary control circuit.

FIG. 4 illustrates a preferred embodiment for the improved secondary control circuit 42. The secondary control circuit 42 is implemented using two logic OR gates, such that each OR gate receives the control signals used to drive diagonal switching devices and outputs a drive signal to one of the two synchronous rectifiers. In the context of the above-described full bridge converter, a first OR gate 52 receives as input the control signals used to drive the first switching device $Q_A$ and the fourth switching device $Q_D$; whereas a second OR gate 54 receives as input the control signals used to drive the third switching device $Q_B$ and the third switching device $Q_C$. The first OR gate 52 and the second OR gate 54 in turn output drive signals to the first rectifying switch $Q_1$ and the second rectifying switch $Q_2$, respectively. As will be apparent to one skilled in the art, various hardware configurations may be used to implement the secondary control circuit 42. It is also envisioned that a totem pole or similar buffer stage may be inserted between the output of the secondary control circuit 42 and the synchronous rectifiers to facilitate faster switching.

The operation of the secondary control circuit 42 is better understood from the timing diagram depicted in FIG. 5. The drive signals for each of the primary switching devices is shown in relation to the drive signals for the synchronous rectifiers as generated by the secondary control circuit 42. As noted above, substantially complementary drive signals serve as input to the first switching device $Q_A$ and the second switching device $Q_B$, and relatively phase shifted substantially complementary control signals serve as input to the third switching device $Q_C$ and the fourth switching device $Q_D$. As a result, diagonal switching devices conduct alternately with a dead time period therebetween.

For instance, when diagonal switching devices $Q_A$ and $Q_D$ are driven to an on state, current flows up through the primary winding of the transformer. On the secondary side, the first rectifying switch $Q_1$ is in an on state and the second rectifying switch $Q_2$ is in an off state, such that the first inductor $L_1$ freewheels and the second inductor $L_2$ stores energy.

A dead time period occurs when the fourth switching device $Q_D$ is driven to an off state. As a result, no current is flowing from the input primary source through the primary winding of a transformer. In a conventional approach, the second rectifying switch $Q_2$ is simultaneously driven to an on state. However, the improved secondary control circuit 42 of the present invention provides a delay before the second rectifying switch $Q_2$ is driven to an on state as shown at 60. In other words, the secondary control circuit is operable to drive the second of the two synchronous rectifiers to an on state only after one of the diagonal switching devices is driven to an off state by the primary control circuit.

Next, the third switching device $Q_C$ is driven to an on state. This delay between the fourth switching device $Q_D$ and the third switching device $Q_C$ is set in primary control circuit. When the third switching device $Q_C$ is driven to an on state, the second rectifying switch $Q_2$ is also driven to an on state. As a result, both of the rectifying switches are turned on during the dead time period and both the inductors on the secondary side are in freewheeling mode. To terminate the freewheeling period, the first switching device $Q_A$ is driven to an off state. At the same time, the first rectifying switch $Q_1$ is also driven to an off state.

To complete the cycle, the second switching device $Q_B$ is driven to an on state. As a result, diagonal switching device $Q_B$ and $Q_C$ are in an on state and current flows down through the primary winding of the transformer.

Thus, the dead time period is terminated. The cycle is then repeated.

It should be appreciated that the improved secondary control circuit of the present invention eliminates the risk of cross conduction between the synchronous rectifiers. In addition, the improved secondary control circuit may be constructed using a minimal part count as well as takes advantage of the standard delays set in the primary control circuit. Lastly, the improved secondary control circuit allows output choke current to flow in the secondary side of the converter during a portion of the delay period, thereby assisting the soft switching control.

While the invention has been described in its presently preferred form, it will be understood that the invention is capable of modification without departing from the spirit of the invention as set forth in the appended claims.

What is claimed is:

1. A method for controlling two synchronous rectifiers in a switching power converter, comprising:

providing two diagonal switching device in a conducting state and; one of the two synchronous rectifiers in an on state;

driving one of two diagonal conducting switching devices to an off state, thereby initiating a dead time period of operation during which no current flows through a primary winding of a transformer; and driving the other of the two synchronous rectifiers to an on state after said one of two diagonal conducting switching devices has been driven to an off state, thereby driving each of the two synchronous rectifiers to an on state during the dead time period.

2. The method of claim 1 further comprises the step of using drive signals for the diagonal switching devices to drive the two synchronous rectifiers.

3. The method of claim 2 further comprises the step of using two logic OR gates to drive the two synchronous rectifiers.

4. The method of claim 1 wherein the switching power converter is further defined as a substantially zero voltage switching phase shifted full bridge converter having a current doubler synchronous rectifier.

5. A switching power converter, comprising:

an input voltage source;

a transformer having a primary winding and a secondary winding;

a switching circuit connected to the primary winding of the transformer for providing bidirectional current flow there through, the switching circuit having a first pair and a second pair of diagonal switching devices;

a rectifying circuit, having two synchronous rectifiers, connected to the secondary winding of the transformer for providing an output voltage of the converter;

a primary control circuit connected to the switching circuit and operable to generate drive signals for the switching device, such that each pair of diagonal switching devices conduct alternately with a dead time period therebetween and the dead time period is initiated when one of the conducting diagonal switching devices is driven to an off state; and a secondary control circuit connected to the rectifying circuit and operable to drive the two synchronous rectifiers to an on state during the dead time period, such that one of the conducting diagonal switching devices is driven to an off state prior to the second of the two synchronous rectifiers being driven to an on state.

6. The switching power converter of claim 5 wherein the dead time period is indicative of no current flowing through the primary winding of the transformer.

7. The switching power converter of claim 5 wherein the secondary control circuit employs the control signals from the primary control circuit to drive the two synchronous rectifiers of the rectifying circuit.

8. The switching power converter of claim 7 wherein the secondary control circuit further includes two logic OR gates, such that each OR gate receives the controls signals used to drive diagonal switching devices and outputs a control signal to one of the two synchronous rectifiers.

9. The switching power converter of claim 5 wherein the switching devices are further defined as MOSFET switches.

10. The switching power converter of claim 5 wherein the two synchronous rectifiers are further defined as MOSFET switches.

11. The switching power converter of claim 5 is further defined as a substantially zero voltage switching phase shifted full bridge converter.

12. A switching power converter, comprising:

an input voltage source;

a switching circuit having a first switching device and a second switching device connected in series to form a first switching leg, and a third switching device and a fourth switching device connected in series to form a second switching leg, each of the switching legs connected in parallel with the input voltage source;

a transformer having a primary winding and a secondary winding, one end of the primary winding being connected to a junction point between the first switching device and the second switching device and the other end of the primary winding being connected to a junction point between the third switching device and the fourth switching device;

a rectifying circuit, having two synchronous rectifiers, connected to the secondary winding of the transformer for providing an output voltage of the converter;

a primary control circuit connected to the switching circuit, the primary control circuit operable to supply substantially complementary control signals to the switching devices in one of the switching legs and relatively phase shifted substantially complementary control signals to the switching devices in the other switching legs, so that diagonal switching devices conduct alternately with a dead time period therebetween and the dead time period is initiated when one of the conducting diagonal switching devices is driven to an off state; and a secondary control circuit connected to the rectifying circuit, the secondary control circuit operable to drive the two synchronous rectifiers to an on state during the dead time period, such that said one of the conducting diagonal switching devices is driven to an off state by the primary control circuit prior to the second of the two synchronous rectifiers being driven to an on state.

13. The switching power converter of claim 12 wherein the dead time period is indicative of no current flowing through the primary winding of the transformer.

14. The switching power converter of claim 12 wherein the secondary control circuit employs the control signals from the primary control circuit to drive the two synchronous rectifiers of the rectifying circuit.

15. The switching power converter of claim 12 wherein the secondary control circuit further includes two logic OR gates, such that each OR gate receives the controls signals used to drive diagonal switching devices and outputs a control signal to one of the two synchronous rectifiers.

16. The switching power converter of claim 12 wherein the switching devices are further defined as MOSFET switches.

17. The switching power converter of claim 12 is further defined as a substantially zero voltage switching phase shifted full bridge converter.

18. The switching power converter of claim 12 wherein the two synchronous rectifiers are further defined as MOSFET switches.

19. The switching power converter of claim 12 wherein the rectifying circuit includes a first MOSFET switch connected in series with a second MOSFET switch, a drain of the first MOSFET switch being connected to one end of the secondary winding of the transformer, a drain of the second MOSFET switch being connected to the other end of the secondary winding of the transformer, and a junction point between the first MOSFET switch and the second MOSFET switch connected to ground.

20. The switching power converter of claim 19 wherein the rectifying circuit further includes a first inductor connected between the drain of the first MOSFET switch and an output terminal for the output voltage of the converter and a second inductor connected between the source of the second MOSFET switch and the output terminal for the output voltage of the converter.

21. A switching power converter, comprising:

an input voltage source;

a switching circuit having a first switching device and a second switching device connected in series to form a first switching leg, and a third switching device and a fourth switching device connected in series to form a second switching leg, each of the switching legs connected in parallel with the input voltage source;

a transformer having a primary winding and a secondary winding, one end of the primary winding being connected to a junction point between the first switching device and the second. switching device and the other end of the primary winding being connected to a junction point between the third switching device and the fourth switching device;

a rectifying circuit, having two synchronous rectifiers, connected to the secondary winding of the transformer for providing an output voltage of the converter;

a primary control circuit connected to the switching circuit and operable to generate a drive signal for each of the switching devices; and a secondary control circuit having a first logic OR gate and a second logic OR gate, the first OR gate receives the drive signals used to control the first and fourth switching devices and outputs a drive signal to one of the two synchronous rectifiers, and the second OR gate receives the drive signals used to control the second and third switching devices and outputs a drive signal to the other of the two synchronous rectifiers.

22. The switching power converter of claim 21 wherein the primary control circuit is operable to supply substantially complementary control signals to the switching devices in one of the switching legs and relatively phase shifted substantially complementary control signals to the switching devices in the other switching legs, so that diagonal switching devices conduct alternately with a dead time period therebetween and the dead time period is initiated when one of the conducting diagonal switching devices is driven to an off state.

23. The switching power converter of claim 22 wherein the secondary control circuit is operable to drive the two synchronous rectifiers to an on state during the dead time period, such that said one of the conducting diagonal switching devices is driven to an off state by the primary control circuit prior to the second of the two synchronous rectifiers being driven to an on state.

24. The switching power converter of claim 21 wherein the switching devices are further defined as MOSFET switches.

25. The switching power converter of claim 21 is further defined as a substantially zero voltage switching phase shifted full bridge converter.

26. The switching power converter of claim 21 wherein the rectifying circuit is defined as a current doubler synchronous rectifier.

* * * * *

UNITED STATES PATENT AND TRADEMARK OFFICE
CERTIFICATE OF CORRECTION

PATENT NO. : 6,504,739 B2
DATED : January 7, 2003
INVENTOR(S) : Vijay Gangadhar Phadke It is certified that error appears in the above-identified patent and that said Letters Patent is hereby corrected as shown below:

<u>Title page,</u>
Item [75], Inventor, after "Mandaluyong", insert -- City --.
Item [56], References Cited, OTHER PUBLICATIONS, reference, "Laslo, Balogh" "Rectificatin" should be --Rectification --.

<u>Column 3,</u>
Line 5, "device" should be -- devices --.

<u>Column 4,</u>
Line 35, "third" should be -- second --.

<u>Column 5,</u>
Line 46, "device" should be -- devices --.
Line 47, after "and" delete ";".

<u>Column 6,</u>
Line 7, "there through" should be -- therethrough --.
Line 36, "controls" should be -- control --.

<u>Column 7,</u>
Line 26, "controls" should be -- control --.

<u>Column 8,</u>
Line 10, after "second" delete ".".

Signed and Sealed this

Sixteenth Day of September, 2003

JAMES E. ROGAN
*Director of the United States Patent and Trademark Office*